Nov. 20, 1923.

W. J. BAIN

AUTOMOBILE JACK FOOT

Filed March 2, 1923

1,474,428

W. J. Bain, Inventor.

By C. A. Snow & Co.
Attorneys

Patented Nov. 20, 1923.

1,474,428

UNITED STATES PATENT OFFICE.

WILLIAM J. BAIN, OF BARNSDALL, OKLAHOMA.

AUTOMOBILE JACK FOOT.

Application filed March 2, 1923. Serial No. 622,359.

*To all whom it may concern:*

Be it known that I, WILLIAM J. BAIN, a citizen of the United States, residing at Barnsdall, in the county of Osage and State of Oklahoma, have invented a new and useful Automobile Jack Foot, of which the following is a specification.

This invention relates to automobile accessories, and more particularly to attachments for jacks.

The object of the invention is to provide a detachable extension foot for automobile jacks to prevent the jack from tipping over during changing of a tire which frequently happens with jacks in ordinary use.

Another object is to provide a device of this character which may be cheaply constructed and when not in use may be stored in a tool box or other convenient place.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1:
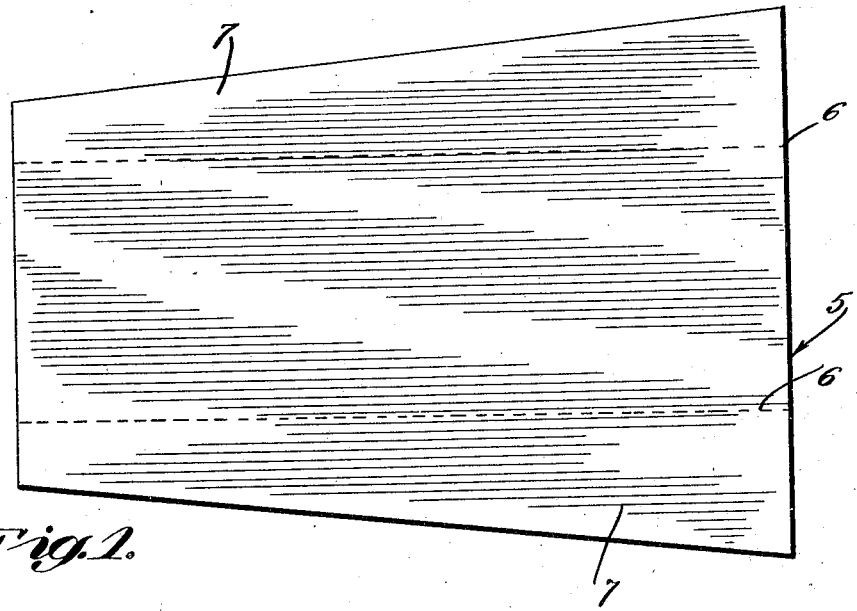
Figure 1 represents a plan view of the blank from which the jack foot is constructed.
Figure 2:
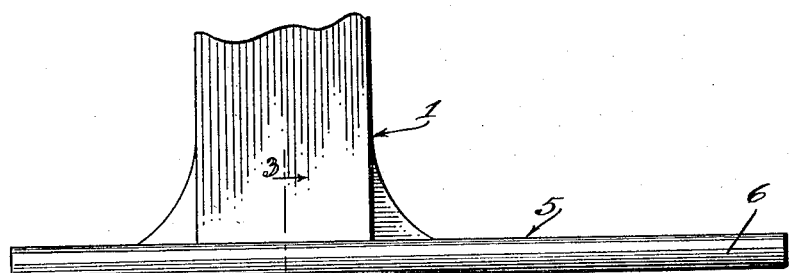
Fig. 2 is a side elevation thereof shown applied.
Figure 3:
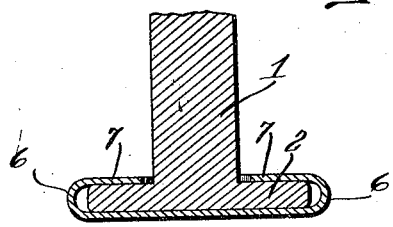
Fig. 3 is a transverse section taken on the line 3—3 of Fig. 2.

In the embodiment illustrated, the lower portion of an automobile jack is shown at 1 having the usual foot 2. The detachable auxiliary foot 5 constituting this invention is constructed of a heavy plate of sheet metal made wider at one end than the other and folded on parallel lines shown at 6, the sides of which, when so folded, form seats to receive the foot 2 of the jack. The sides 7 when so folded, form a slot-like seat in the top of the foot the side walls of which taper toward one end so that when applied to the jack, the foot 2 thereof will wedge in this slot and securely fasten the auxiliary foot to the jack. The auxiliary foot 5 may be of any desired length and obviously is quickly applied by slipping it on the foot of the jack and operates to prevent the jack tilting or tipping over when in use. When not in use, it may be removed from the jack and stored in any suitable place.

Various changes in the form, shape and proportion or other details of construction may be made without departing from the principle or sacrificing any of the advantages of the claimed invention.

I claim:—

1. An auxiliary foot for an automobile jack comprising a base having a tapered seat to receive the foot of a jack.

2. A device of the class described comprising a base having means for detachable connection with a jack foot, said means comprising inturned side flanges, the edges of which converge toward one end.

In testimony that I claim the foregoing as my own, I have hereto affixed my signature in the presence of two witnesses.

WILLIAM J. BAIN.

Witnesses:
H. O. McSPADDEN,
L. T. MUSSELWHITE.